United States Patent
Yen et al.

(10) Patent No.: US 8,037,006 B2
(45) Date of Patent: Oct. 11, 2011

(54) SOUND CLASSIFICATION SYSTEM AND METHOD CAPABLE OF ADDING AND CORRECTING A SOUND TYPE

(75) Inventors: Chia-Shin Yen, Taipei (TW); Che-Ming Lin, Taipei (TW); Koichiro Mizushima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 938 days.

(21) Appl. No.: 11/994,037

(22) PCT Filed: Jun. 27, 2006

(86) PCT No.: PCT/JP2006/313178
§ 371 (c)(1),
(2), (4) Date: Dec. 27, 2007

(87) PCT Pub. No.: WO2007/001068
PCT Pub. Date: Jan. 4, 2007

(65) Prior Publication Data
US 2009/0228422 A1    Sep. 10, 2009

(30) Foreign Application Priority Data
Jun. 28, 2005 (CN) .......................... 2005 1 0079167

(51) Int. Cl.
*G06F 17/00* (2006.01)
*G06N 5/02* (2006.01)

(52) U.S. Cl. ............................... 706/48; 706/20; 706/16
(58) Field of Classification Search ........................ None
See application file for complete search history.

(56) References Cited

U.S. PATENT DOCUMENTS

| | | | |
|---|---|---|---|
| 7,089,178 B2* | 8/2006 | Garudadri et al. | 704/205 |
| 2003/0223621 A1* | 12/2003 | Rowe et al. | 382/115 |
| 2006/0239472 A1 | 10/2006 | Oda | |
| 2007/0179780 A1 | 8/2007 | Yamanashi et al. | |
| 2007/0291949 A1 | 12/2007 | Imaki | |
| 2008/0010072 A1 | 1/2008 | Yoshida et al. | |

FOREIGN PATENT DOCUMENTS
WO     01/16937     3/2001

OTHER PUBLICATIONS

Livshin et al., A., "The Importance of Cross Database Evaluation in Sound Classification", ISMIR 2003, pp. 1-2, 2003.*
Stager et al., M., "SoundButton: Design of a Low Power Wearable Audio Classification System", IEEE Symposium on Wearable Computers, pp. 1-6, 2003.*

(Continued)

*Primary Examiner* — Jeffrey A Gaffin
*Assistant Examiner* — Adrian Kennedy
(74) *Attorney, Agent, or Firm* — Greenblum & Bernstein, P.L.C.

(57) ABSTRACT

A sound classification system for adding and correcting a sound type is disclosed. When the add/correct command processor receives a command to add or correct a sound type, the data in the first database is stored in the second database, and the type adding/correcting device adds the feature of the sound to the first database, and re-calculates the statistical values. Besides, the classifier re-classifies the sample sounds, and the precision calculator calculates a ratio of accurate classification. When the ratio is high, the type adding/correcting device stores, in the feature database, the feature of the sound for which a type is to be added or corrected. When the ratio is low, the second database restores the data back to the first database.

22 Claims, 6 Drawing Sheets

OTHER PUBLICATIONS

Cowling et al., M., "Comparison of Techniques for Environmental Sound Recogntion", Pattern Recognition Letters 24, pp. 2895-2907, 2003.*

Setnes et al., M., "Fuzzy Relational classifier Trained by Fuzzy Clustering", IEEE Transactions on Systems, Man, Cybernetics-Part B: Cybernetics, vol. 29, No. 5, pp. 619-625, Oct. 1999.*

Couvreur, C., "Environmental Sound Recognition: A Statistical Approach", pp. 1-3, 1997.*

Rabiner et al., "Fundamentals of Speech Recognition", Prentice Hall, 1993, pp. 183-190.

Bow, "Pattern Recognition", Marcel Dekker, Inc., New York and Basel, pp. 80-82.

* cited by examiner

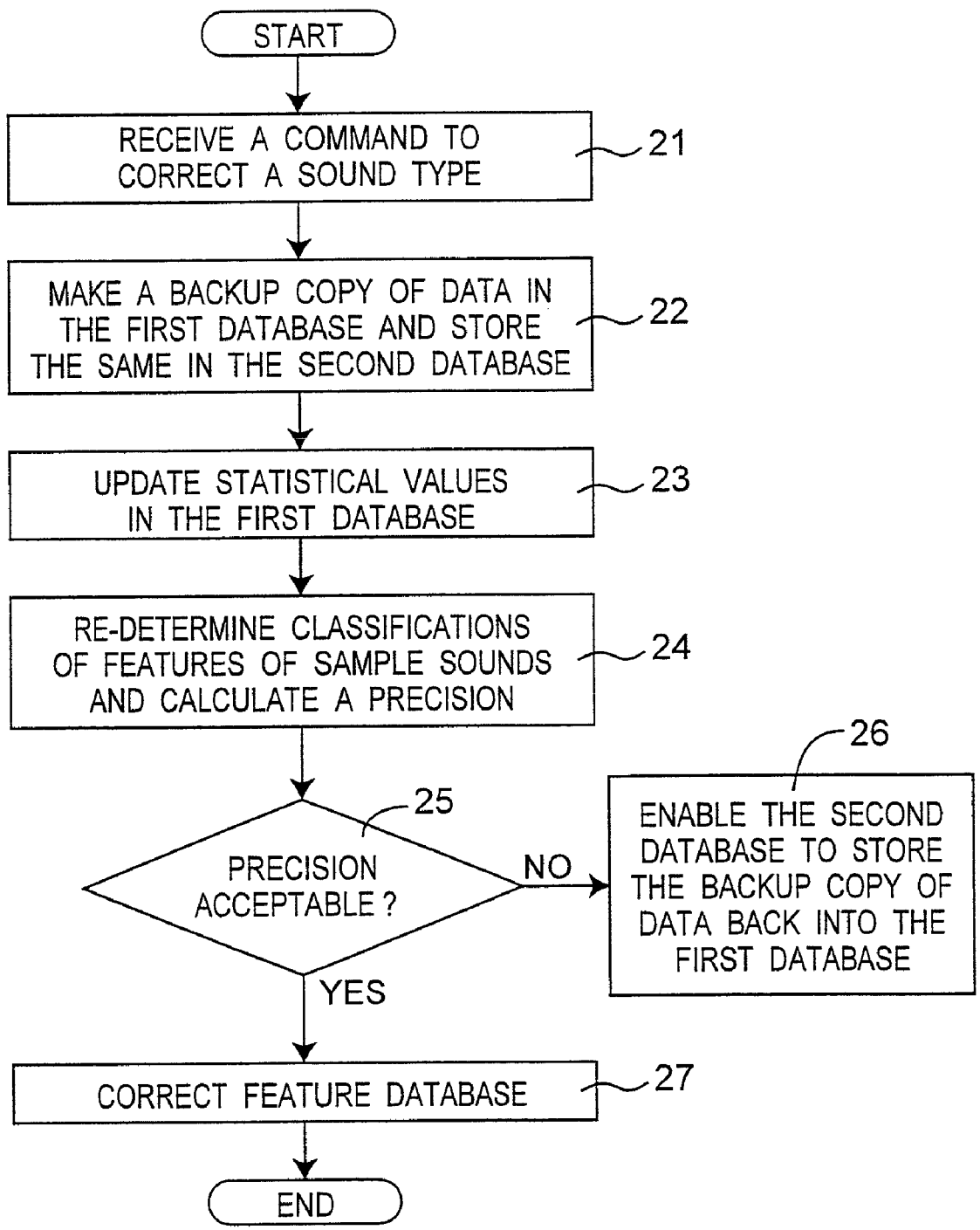

SOUND CLASSIFICATION SYSTEM AND METHOD CAPABLE OF ADDING AND CORRECTING A SOUND TYPE

TECHNICAL FIELD

The invention relates to a system and method for sound classification, more particularly to a system and method for sound classification, which permit addition and correction of sound types.

BACKGROUND ART

Referring to FIG. 1, a conventional sound classification system 8 is used for receiving a sound that has yet to be classified, and recognizing the sound so as to determine whether the sound belongs to a sound type that has a particular significance for the user.

The conventional sound classification system can pre-classify a plurality of sound types that have particular significance and store the same in the sound classification system 8. For instance, siren sounds, telephone ringing sounds, and sounds of breaking glass can be three main pre-classified sound types. When a sound of the aforementioned types is present in the environment, the sound classification system 8 can receive and classify the sound, and can notify the user of the occurrence of a certain type of sound. For instance, when the sound classification system 8 determines there are telephone ringing sounds, it can notify the user to answer the telephone. Alternatively, when the sound classification system 8 determines there are sounds of breaking glass, it notifies the user of the possibility of a thief breaking in through a window.

The conventional sound classification system 8 includes a sound receiver 81, a feature extractor 82, a classifier 83, a database 84, and a classification recorder 85. The database 84 stores features of a plurality of sound signals. The sound receiver 81 is any piece of equipment capable of receiving sounds, such as a microphone. The feature extractor 82 can receive the sound signal from the sound receiver 81, and can find out the feature of the sound signal.

The feature extractor 82 analyzes a feature vector of the sound signal using Mel-scale Frequency Cepstral Coefficients (MFCC), and uses the feature vector as the feature of the sound signal. For the MFCC scheme, reference can be made to "Fundamentals of Speech Recognition" by L. Rabiner and B.-H. Juang, Prentice Hall, 1993. According to the MFCC scheme, the sound signal is transformed from a time domain signal to a frequency domain signal using Fourier Transform, the frequency domain signal representing the energy of the sound at each frequency. Energy values of corresponding frequency ranges are obtained from the multiplication of a plurality of triangular band-pass filters covering the different frequency ranges, each of which represents a different weight, by the energy value of each corresponding frequency, where one of the triangular band-pass filters covers a corresponding sound frequency range that is perceivable by human auditory organs. Thus, a plurality of feature values equivalent to the triangular band-pass filters in number can be obtained. The feature values can be used as a feature vector that can represent the sound.

The database 84 pre-stores the features of many sound types, e.g., siren sound, telephone ringing sound, sound of breaking glass, and door opening sound, where each sound type in general includes a plurality of sounds. For example, the door opening sound type includes a plurality of pre-recorded door opening sounds.

The classifier 83 compares the feature analyzed by the feature extractor 82 with the pre-stored features in the database 84. When the feature analyzed by the feature extractor 82 matches or is similar to the feature of one of the sound types in the database 84, the sound received by the sound receiver 81 will be regarded as an instance of said one of the sound types. The classification recorder 85 stores the classification result of each inputted sound classified by the classifier 83, as well as the feature thereof.

The classification scheme adopted by the classifier 83 can be the Mahalanobis Distance scheme described in "Pattern Recognition" written by S.-T. Bow and published by Jwang Yuan in 1984. The scheme is mainly used to calculate the distance between the feature vector of the sound signal received by the sound receiver 81 and those of all sound types stored in the database 84. When a smallest distance exists, this will indicate that the sound signal received by the sound receiver 81 matches the corresponding sound type in the database 84.

However, there are numerous sound types in real life. It is impossible for the conventional pre-constructed database 84 to contain all the sounds that may probably occur. Besides, the conventional sound classification system 8 cannot process sound types that are not stored in the database 84. Therefore, if the user is allowed to add sound types to the database 84, the practicality of the sound classification system 8 can be effectively enhanced.

Furthermore, due to differences between various environments, sounds may also exhibit different features in different environments. For instance, the same door opening sound may produce a relatively loud echo in a relatively spacious environment, but may have a completely different feature in an environment that can better absorb its sound energy. When the different types of sounds are recorded in the database 84, the environments in which the sounds are recorded are oftentimes different from the environment the user is in. If the user cannot add or correct samples of the sound types pre-constructed in the database 84 with respect to the environment of use, this may result in problems that the sound classification system 8 makes erroneous classification in a new environment, or is even unable to perform the classification.

DISCLOSURE OF INVENTION

Therefore, an object of the present invention is to provide a sound classification system that permits addition and correction of a sound type. The sound classification system permits the user to add a sound type that occurs in an environment of use and that has a particular significance for the user, and allows the user to correct the type of a received sound.

Another object of the present invention is to provide a method for sound classification, which allows for addition or correction of a sound type. The method for sound classification can be used to determine whether to correct an existing sound type or add a new sound type according to the precision of a classification result.

Accordingly, the sound classification system of this invention is capable of adding and correcting sound types, and includes a sound receiver, a feature extractor, a first database, a feature database, a classifier, a classification recorder, a second database, an add/correct command processor, a precision calculator, and a type adding/correcting device.

The sound receiver receives a sound signal to be recognized. The feature extractor receives the sound signal to be recognized from the sound receiver, and finds out a feature of the sound signal. The first database stores statistical values of features of a plurality of sounds. The classifier is electrically connected to the feature extractor and the first database, receives the feature analyzed by the feature extractor, classifies the sound signal to be recognized according to the statistical values of the sounds in the first database, and outputs a classification result.

The classification recorder is electrically connected to the classifier, and stores the classification result from the classifier and the feature of the sound signal to be recognized. The second database is electrically connected to the first database, and is capable of making a backup copy of data stored in the first database and timely restoring the backup copy of data to the first database after a change in the data stored in the first database.

The feature database stores features of a plurality of sample sounds, and is capable of outputting the features of the sample sounds to the classifier.

The add/correct command processor is electrically connected to the classification recorder, and, upon the receipt of a command to correct the classification result or to add a new type, instructs the classification recorder to output the feature of the sound requiring correction of the type thereof or addition of a new type.

The type adding/correcting device is electrically connected to the add/correct command processor, the first database, and the feature database, receives the feature of the sound requiring correction of the type thereof or addition of a new type as outputted by the add/correct command processor, and updates the statistical values of the features in the first database using the feature of the sound after the backup copy of the data in the first database has been stored in the second database. The classifier retrieves the features of all the sample sounds stored in the feature database after updating the statistical values in the first database, and re-determines the classification of the features of the sample sounds according to the statistical values of the features of the sound types in the first database.

The precision calculator is electrically connected to the classifier, and calculates and displays a ratio of accurate classification of the features of the sample sounds in the feature database by the classifier such that when the ratio is higher than a threshold value, the precision calculator sends the feature of the sound to the feature database for storage, and retains the updated statistical values in the first database, and otherwise, the second database stores the backup copy of the data back into the first database.

Accordingly, the method for correcting a sound type of the present invention is adapted for use in a sound classification system to allow a user to correct a sound type, where the sound classification system includes a first database for storing statistical values of features of a plurality of sounds, a classifier, a second database, a feature database for storing features of a plurality of sample sounds that have been accurately classified, an add/correct command processor, a type adding/correcting device, and a precision calculator. The method comprises the following steps of:

(A) instructing the add/correct command processor to receive a command to correct a sound type;

(B) storing the statistical values of the features of the sound types in the first database into the second database to make a backup copy of data in the first database;

(C) instructing the type adding/correcting device to add the feature of a sound requiring type correction to a type in the first database which was selected by the user, and to re-calculate the statistical values of the features of the sounds of the selected type in the first database;

(D) instructing the classifier to retrieve the features of all the sample sounds in the feature database and to re-determine the classifications of the features of the sample sounds according to the statistical values of the features of each of the sound types in the first database, and instructing the precision calculator to calculate a ratio of accurate classification of the features of the sample sounds by the classifier; and (E) instructing the type adding/correcting device to store the feature of the sound of the type to be corrected in the feature database if the ratio of accurate classification of the features of the sample sounds by the classifier is greater than a threshold value, and otherwise, instructing the second database to store the backup copy of data back into the first database.

Accordingly, the method for adding a sound type according to the present invention is adapted for use in a sound classification system to enable a user to add a sound type. The method comprises the following steps of:

(A) instructing an add/correct command processor to receive a command to add a sound type;

(B) storing statistical values of features of the sound types in a first database into a second database to make a backup copy of data in the first database;

(C) instructing a type adding/correcting device to add the feature of a sound requiring addition of a sound type to the first database, and to calculate the statistical values of the feature of the added sound type;

(D) instructing a classifier to retrieve the features of all sample sounds in a feature database, and to re-determine the classifications of the features of the sample sounds according to the statistical values of the features of each of the sound types in the first database, and instructing a precision calculator to calculate a ratio of accurate classification of the features of the sample sounds by the classifier; and (E) instructing the type adding/correcting device to store the feature of the sound of the added type in the feature database if the ratio of accurate classification of the features of the sample sounds by the classifier is greater than a threshold value, and otherwise, instructing the second database to store the backup copy of data back into the first database.

BRIEF DESCRIPTION OF DRAWINGS

Other features and advantages of the present invention will become apparent in the following detailed description of the preferred embodiment with reference to the accompanying drawings, of which:

FIG. 6 is a flowchart to illustrate the steps for correcting a sound type.

BEST MODE FOR CARRYING OUT THE INVENTION

Figure 1:
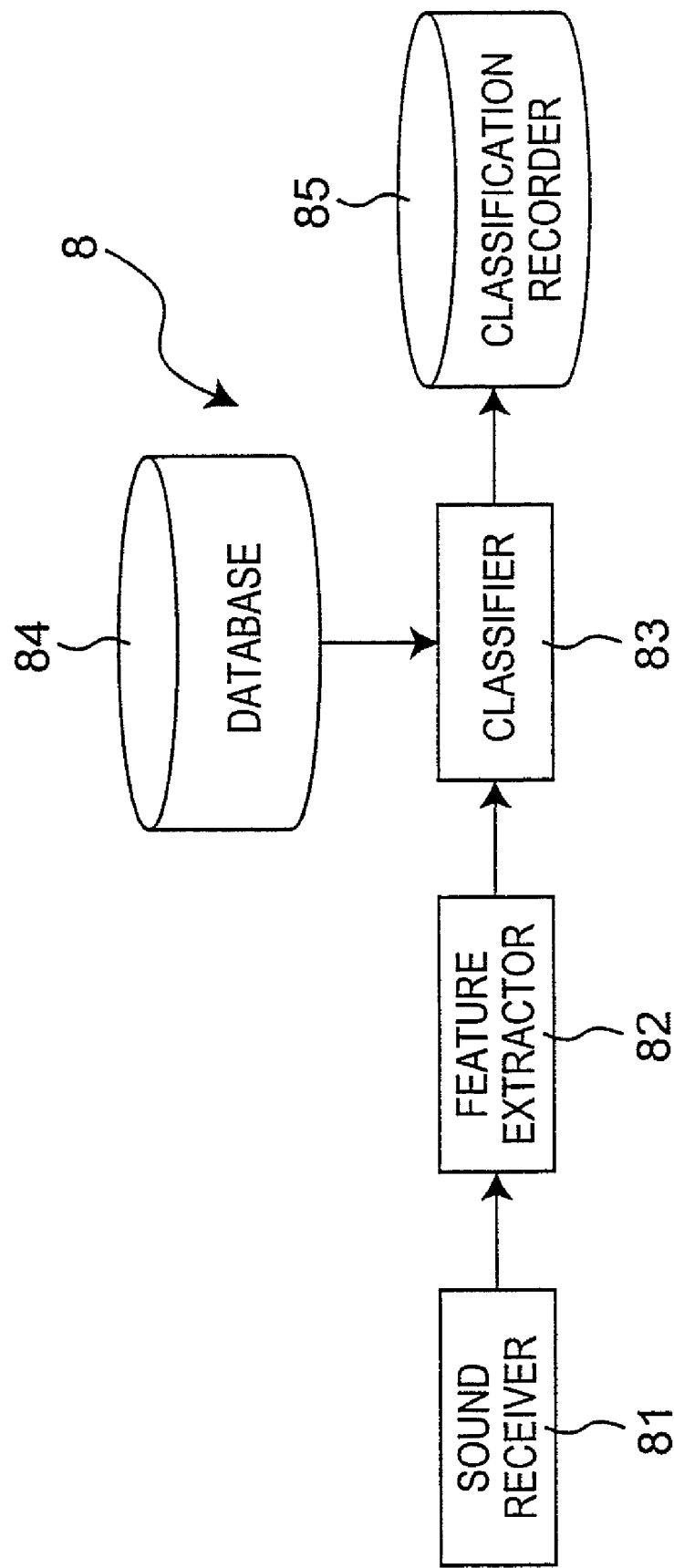
FIG. 1 is a block diagram to illustrate the system architecture of a conventional sound classification system.
Figure 2:
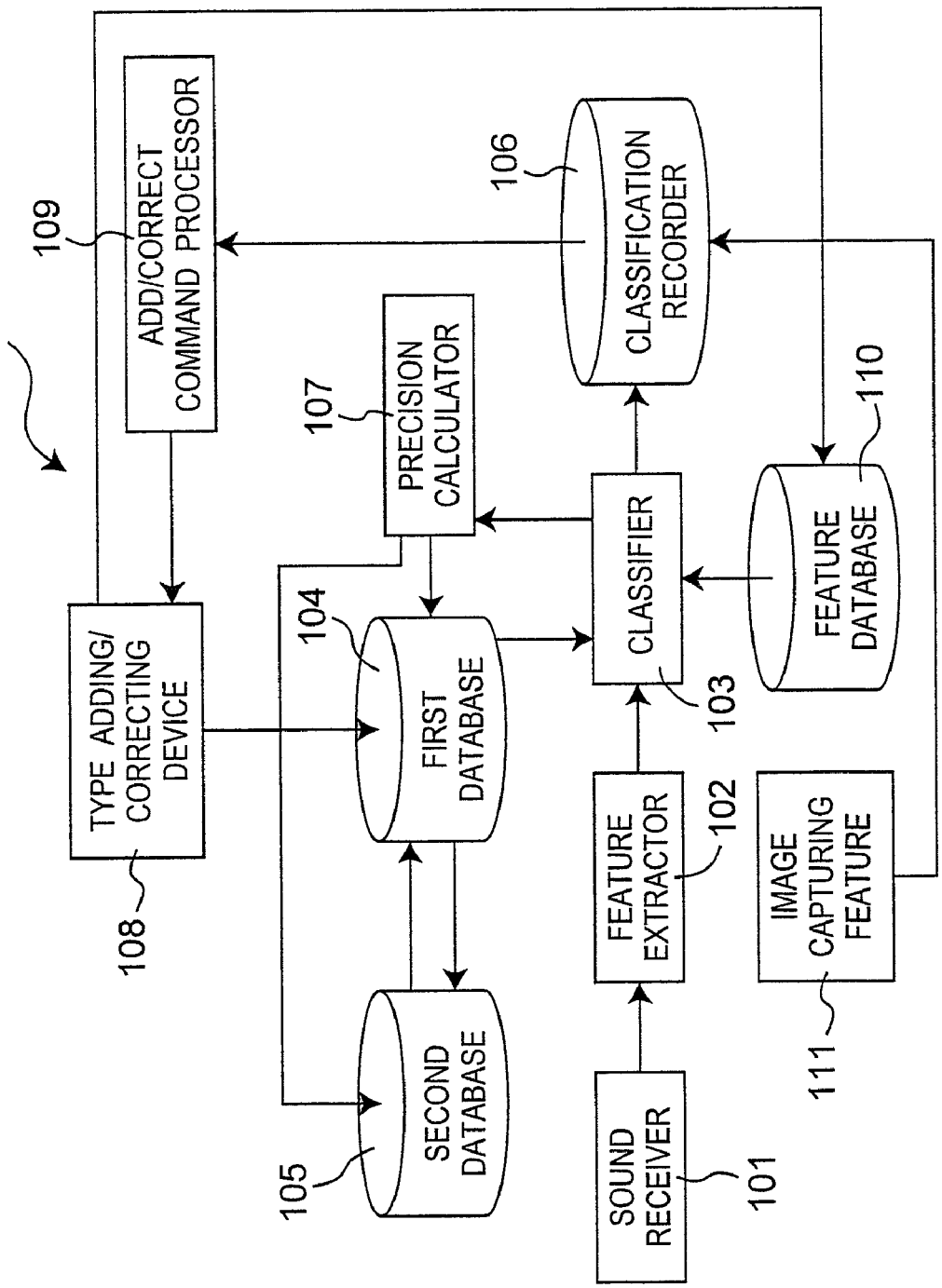
FIG. 2 is a block diagram to illustrate the system architecture of a sound classification system capable of adding and correcting sound types according to the present invention.

Referring to FIG. 2, the preferred embodiment of a sound classification system capable of adding and correcting sound types according to the present invention is shown to include a sound receiver 101, a feature extractor 102, a classifier 103, a first database 104, a second database 105, a classification recorder 106, a precision calculator 107, a type adding/correcting device 108, an add/correct command processor 109, a feature database 110, and an image capturing device 111.

The sound receiver 101 can receive external sounds. The feature extractor 102 can receive the sound signal from the sound receiver 101 and find out the feature of the sound signal.

The feature of the sound signal is represented by a feature vector analyzed using the conventional Mel-scale Frequency Cepstral Coefficients (MFCC). Since the aforesaid scheme has been discussed in the description of the related art hereinabove, it will not be discussed further herein for the sake of brevity.

In addition, it is noted that the scheme used by the feature extractor 102 to calculate the features of sounds can be, but not limited to, other frequency domain analyzing schemes, such as schemes using frequency bins as components of the feature vector, or schemes adopting the time domain feature of the sound signal, e.g., schemes using the energy or zero crossing rate of the sound signal as the feature of the sound signal.

The first database 104 stores the statistical values of the features of a plurality of types of sounds, where each type of sound includes at least one sound signal. In this embodiment, the statistical value is, but is not limited to, a mean and a variance of all the features of a type of sound signals. For example, sounds of breaking glass type include 100 entries of breaking glass sounds, and each entry of breaking glass sound has a feature. Therefore, the statistical value for the breaking glass type includes a mean and a variance of the features of the 100 entries of breaking glass sounds.

The classifier 103 compares the feature analyzed by the feature extractor 102 with those of all sound types stored in the first database 104 so as to classify the sound signal received by the sound receiver 101 into a proper sound type, and sends the classification result to the classification recorder 106.

In this embodiment, the comparison scheme adopted by the classifier 103 is, but is not limited to, the Mahalanobis Distance scheme mentioned in the Description of the Related Art. The classifier 103 may also use the conventional Euclidian Distance scheme for comparison, and the comparison scheme is to calculate the Euclidian distance between the feature of the sound signal received by the sound receiver 101 and the statistical values in the first database 104. When a smallest Euclidian distance exists, this will indicate that the sound signal received by the sound receiver 101 matches the corresponding sound type in the first database 104.

The classifier 103 may also employ other schemes, such as the Hidden Markov models described in "Fundamentals of Speech Recognition" written by L. Rabiner and B.-H. Juang and published by Prentice Hall in 1993, to determine the classification of the sound received by the sound receiver 101. In this case, the transfer matrices in the hidden Markov model are used as the statistical values of the features of sound types in the first database 104.

In addition, the classifier 103 may also adopt neural networks to classify the sound received by the sound receiver 101. In this regard, reference can be made to "Neural Network Design" written by Martin T. Hagan, Howard B. Demuth and Mark H. Beale and published by PWS-KENT in 1996. In this case, the weight of each neuron in the neural network is used as the statistical value of the features of a sound type in the first database 104.

The image capturing device 111 is electrically connected to the classification recorder 106, and is capable of capturing images of the environment when the sound is generated for storage in the classification recorder 106 so as to assist in the determination of an event occurring in the environment when the sound was generated. For example, when the classifier 103 classifies the received sound as a sound of the breaking glass type, it can be known from the image captured by the image capturing device 111 that the sound was produced as a result of the breaking of window glass or car window glass. Moreover, based on the captured image, the user can also confirm whether the classifier 103 has made a wrong classification.

The classification recorder 106 stores the classification result of each sound outputted by the classifier 103. The classification result includes the type, the feature vector, the time of reception of the sound, the sound waveform, the image captured upon generation of the sound, and the duration of the sound. If the received sound cannot be classified as any one of the sound types in the first database 104, the classification recorder 106 will also store the result therein.

After the sound classification system has operated for a period of time, the classification recorder 106 will have stored therein a plurality of entries of classification results of the sounds received by the sound receiver 101. When an entry of sound classification result is erroneous and does not match the user's expectation, the user can correct the type of the corresponding sound. Alternatively, when a sound cannot be classified as any one of the types in the first database 104, the user can add a sound type representing the sound.

The add/correct command processor 109 can receive commands to correct a sound type and to add a sound type, can retrieve the classification results of sounds from the classification recorder 106 to allow the user to select a sound that requires correction or addition of the sound type thereof, and can send the sound requiring type correction or addition as selected by the user to the type adding/correcting device 108.

The feature database 110 stores the features of a plurality of entries of sample sounds. The sample sounds are sounds whose features have been accurately classified, can be pre-stored by the user or the system manufacturer, and can be added according to the requirements of the user.

Figure 3:
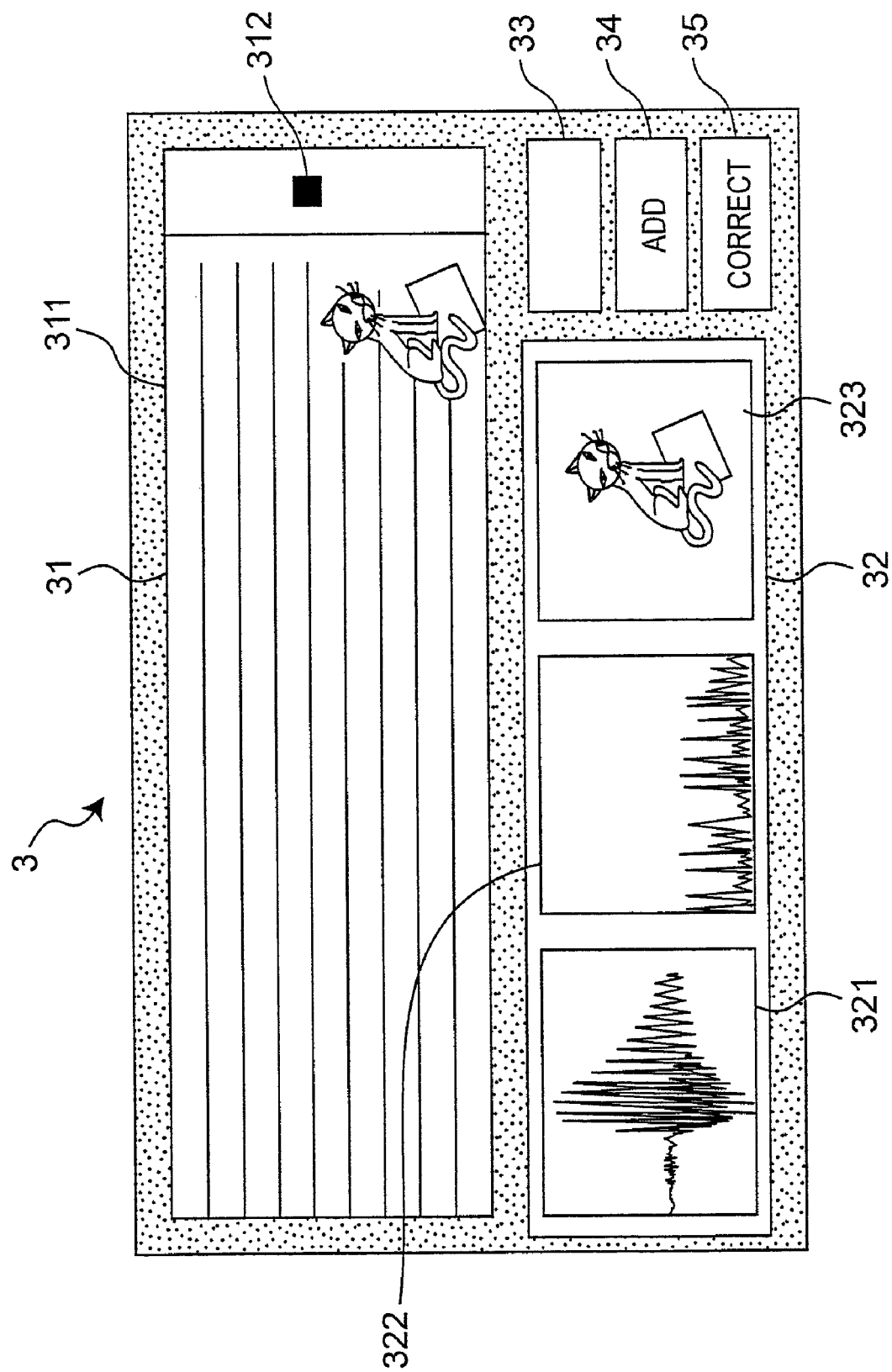
FIG. 3 shows an operation interface for adding/correcting a sound type.

The add/correct command processor 109 can display an add/correct sound type operation interface 3 as shown in FIG. 3 to allow the user to input a command to correct a sound type or to add a sound type. The add/correct sound type operation interface 3 includes a selection area 31, a browsing area 32, a playback button 33, an add type button 34, and a correct type button 35.

The selection area 31 includes a record window 311 and a scroll-and-select key 312. The record window 311 can display the classification results of a plurality of entries of sounds for the user's selection of a sound, whose type is to be corrected or added. At the same time, the record window 311 also displays an icon representing the type of the selected sound. For instance, if a meow sound is selected, the image of a cat will be displayed in the record window 311. Movement of the scroll-and-select key 312 can be controlled via a mouse or a joystick so as to scroll the record window 311.

The browsing area 32 includes a sound waveform window 321, a sound spectrum window 322, and a sound image window 323. When the user selects the classification result of a sound type in the record window 311, all the windows 321, 322, 323 in the browsing area 32 will correspondingly display data related to the entry of sound classification result, i.e., the sound waveform window 321 will display the waveform of the sound, the sound spectrum window 322 will display the spectrum of the sound, and the sound image window 323 will display the image captured by the image capturing device 111 when the sound occurred.

The user can click the playback button 33 to play back the sound of the selected sound classification result so as to confirm whether the sound has been accurately classified by the classifier 103.

Figure 4:
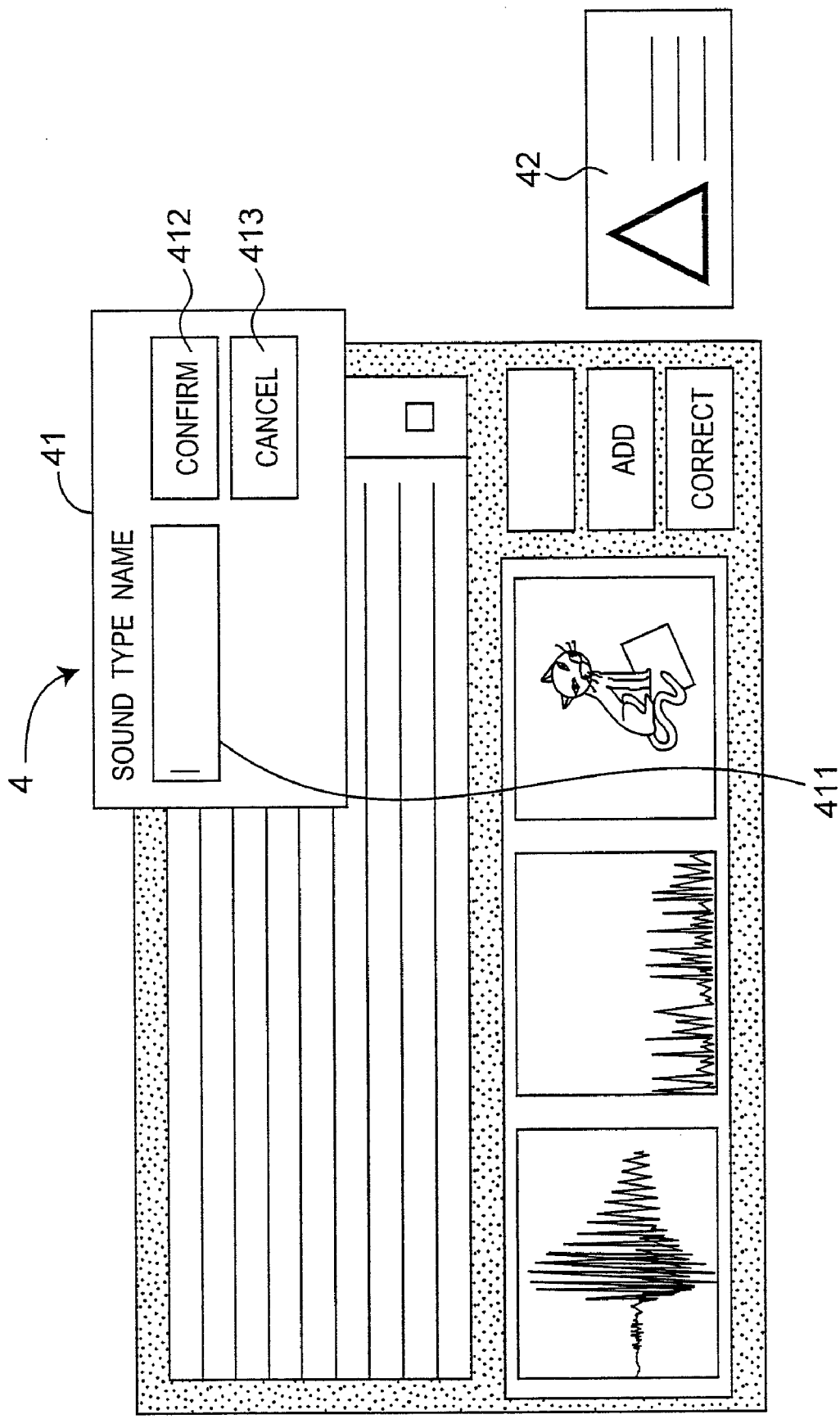
FIG. 4 shows an operation interface for adding a sound type.

When the user clicks the add type button 34, the add/correct command processor 109 will display an add sound type operation interface 4 as shown in FIG. 4. The add sound type operation interface 4 includes a type name input window 41 and an add type prompt window 42.

The type name input window 41 includes a type name input field 411, an add type confirm key 412, and an add type cancel key 413. The user can input a sound type name to be added in the type name input field 411. The add/correct command processor 109 will inspect whether the inputted sound type name already exists. In the affirmative, the add/correct command processor 109 will notify the user via the add type prompt window 42 to input another type name. The add type confirm key 412 and the add type cancel key 413 respectively allow the user to confirm a command to add a sound type and to cancel a command to add a sound type.

Figure 5:
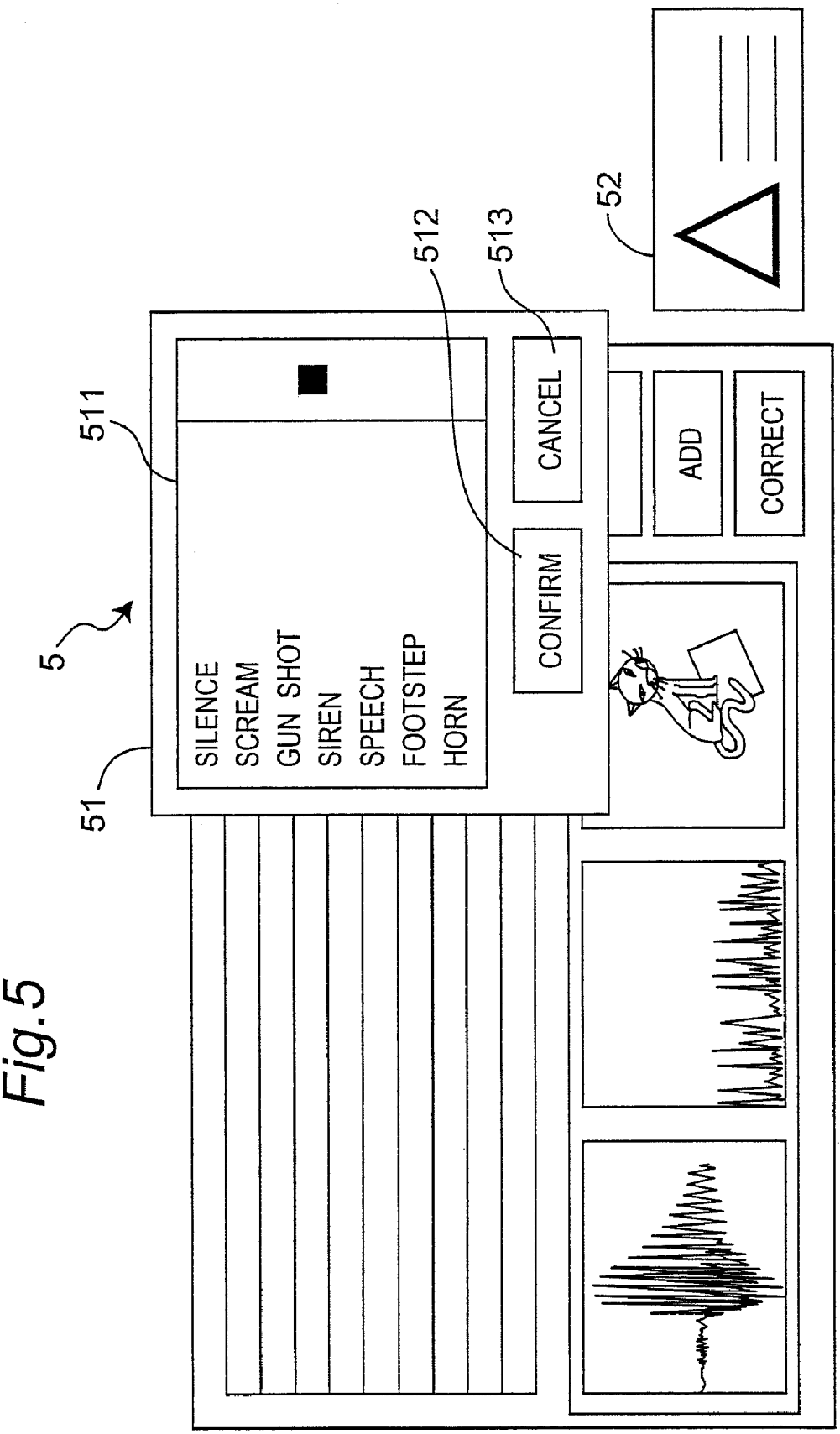
FIG. 5 shows an operation interface for correcting a sound type.

When the user clicks the correct type button 35, the add/correct command processor 109 will display a correct sound type operation interface 5 as shown in FIG. 5. The correct sound type operation interface 5 includes an existing sound type window 51 and a correct type prompt window 52. The existing sound type window 51 includes an existing sound type display area 511, a correct type confirm key 512, and a correct type cancel key 513. The existing sound type display area 511 can display all the existing sound types. The sound types are selectable by the user to replace the sound type of the sound classification result selected in the selection area 31 of the add/correct sound type operation interface 3. For instance, if the sound type of the selected sound classification result in the selection area 31 was originally classified as a meow sound type, when the user selects a scream sound type in the existing sound type display area 511, the meow sound type will be replaced by the scream sound type.

The add/correct command processor 109 displays important messages for the user through the correct type prompt window 52. The correct type confirm key 512 and the correct type cancel key 513 respectively allow the user to confirm a command to correct a sound type and cancel a command to correct a sound type.

With reference to FIG. 6, the method for correcting a sound type according to the present invention is shown and includes the following steps:

In step 21, the add/correct command processor 109 receives a command to correct a sound type from the user.

In step 22, the type adding/correcting device 108 stores the statistical values in the first database 104 into the second database 105 so as to make a backup copy of data in the first database 104.

In step 23, the type adding/correcting device 108 adds the feature vector of the sound to the type selected by the user in the first database 104, and re-calculates the statistical values of the feature vectors of the sounds of the selected type in the first database 104.

In step 24, the classifier 103 retrieves the feature vectors of all sample sounds in the feature database 110, and re-determines the classifications of the features of the sample sounds according to the statistical value of the feature vectors of each of the sound types in the first database 104. Furthermore, the precision calculator 107 calculates a ratio of accurate classification of the features of the sample sounds by the classifier 103.

In step 25, it is determined whether the ratio of accurate classification of the feature vectors of the sample sounds by the classifier 103, i.e., the precision, is acceptable to the user. In the affirmative, the flow skips to step 27. Otherwise, the flow proceeds to step 26.

In step 26, if the precision is not acceptable, the second database 105 will restore the backup copy of the data to the first database 104 so that the first database 104 is in the same previous state before the type correction.

In step 27, if the user accepts the precision after the correction of the first database 104 is made, the type adding/correcting device 108 will store the feature vector of the sound whose type has been corrected in the feature database 110 so that the feature database 110 has one sample sound feature added thereto.

It is noted that the precision calculator 107 may be preset with a precision threshold value. When the precision of re-classification of the sample sound features in the feature database 110 by the classifier 103 is smaller than the threshold value, the precision calculator 107 can automatically abort the command to correct the sound type, and restore the backup copy of the data stored in the second database 105 to the first database 104.

When the user wishes to add a sound type, the process flow for adding the sound type is similar to that for correcting a sound type as described above. Besides, the operations of the add/correct command processor 109, the type adding/correcting device 108, the first and second databases 104,105, and the feature database 110 are substantially the same as those for correcting a sound type as described above. The only difference resides in that the user needs to input a type name for the type to be added in the add sound type operation interface 4, and the add/correct command processor 109 needs to determine whether the type name already exists. If the type name already exists, the user must be notified to input another type name that does not exist. Moreover, the type adding/correcting device 108 calculates the mean and variance of the feature vector of the new sound type using the feature vector of the sound of the new sound type.

In sum, the sound classification system 1 capable of adding and correcting a sound type according to the present invention allows the user to select therefrom a sound whose type is to be corrected by the user, through the add/correct command processor 109 and the type adding/correcting device 108. The present invention also allows the user to add a new sound type so as to include sounds of the new type, and to correct the first database 104 using the features of the sounds of the new type. If the first database 104, after correction, cannot provide the classifier 103 with a sufficient precision to classify the features of the sample sounds in the feature database 110, the command to correct a sound type or to add a new type can be aborted. Thus, the object of enabling the user to classify sounds and to add new sound types with flexibility can be achieved. Besides, the sound classification accuracy of the system can be maintained, thereby positively achieving the effects of the present invention.

According to one preferred arrangement of the invention, a sound classification system capable of adding and correcting a sound type, comprises:

a sound receiver for receiving a sound signal to be recognized;

a feature extractor for receiving the sound signal to be recognized from said sound receiver, and for finding out the feature of the sound signal;

a first database for storing the statistical values of the features of a plurality of sounds;

a classifier electrically connected to said feature extractor and said first database, receiving the feature analyzed by said feature extractor, classifying the sound signal to be recognized according to the statistical values of the sounds in said first database, and outputting a classification result;

a classification recorder electrically connected to said classifier and storing the classification result from said classifier and the feature of the sound signal to be recognized;

a second database electrically connected to said first database, and capable of making a backup copy of data stored in said first database and timely restoring the backup copy of data back to said first database after a change in the data stored in said first database;

a feature database for storing the features of a plurality of sample sounds, and capable of outputting the features of the sample sounds to said classifier;

an add/correct command processor electrically connected to said classification recorder, and, upon the receipt of a command to correct the classification result or to add a new type, instructing said classification recorder to output the feature of the sound requiring correction of the type thereof or addition of a new type;

a type adding/correcting device electrically connected to said add/correct command processor, said first database, and said feature database, receiving the feature of the sound requiring correction of the type thereof or addition of a new type as outputted by said add/correct command processor, and updating the statistical values of the features in said first database using the feature of the sound after the backup copy of the data in said first database has been stored into said second database, said classifier retrieving the features of all the sample sounds stored in said feature database after updating of the statistical values in said first database, and re-determining classification of the features of the sample sounds according to the statistical values of the features of the sound types in said first database; and a precision calculator electrically connected to said classifier, and calculating and displaying a ratio of accurate classification of the features of the sample sounds in said feature database by said classifier such that when the ratio is higher than a threshold value, said precision calculator sends the feature of the sound to said feature database for storage, and retains the updated statistical values in said first database, and otherwise, said second database stores the backup copy of the data back into said first database.

The present invention is not limited to the above arrangement, but should be construed based on the claims.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

INDUSTRIAL APPLICABILITY

The present invention can be applied to sound classification system and method capable of adding and correcting a sound type.

The invention claimed is:

1. A sound classification system capable of adding and correcting a sound type, comprising:
    a sound receiver for receiving a sound signal to be recognized;
    a feature extractor for finding out a feature of said sound signal;
    a first database for storing statistical values of features of a plurality of sounds;
    a classifier for classifying said sound signal;
    a classification recorder for storing the classification result from said classifier and the feature of said sound signal;
    a second database for making a backup copy of data stored in said first database;
    a feature database for storing features of a plurality of sample sounds;
    an add/correct command processor, upon receipt of a command to correct a classification result or to add a new type, instructing said classification recorder to output the feature of the sound requiring correction or to be added;
    a type adding/correcting device for receiving the feature of the sound requiring correction or to be added outputted by said add/correct command processor, and updating the corresponding statistical values of the features in said first database;
    a precision calculator for calculating a ratio of accurate classification of the features of the sample sounds in said feature database by said classifier; and
    an image capturing device capable of capturing an image of an environment where the sound signal to be recognized is generated.

2. The sound classification system according to claim 1, wherein said classifier classifies said sound signal according to the statistical values of the sounds in said first database, and outputs a classification result.

3. The sound classification system according to claim 1, wherein said feature extractor uses a feature vector obtained via Mel-scale Frequency Cepstral Coefficients as the feature of said sound signal.

4. The sound classification system according to claim 1, wherein said feature extractor analyzes frequency bins of said sound signal spectrum to serve as the feature of said sound signal.

5. The sound classification system according to claim 1, wherein said feature extractor calculates the energy of said sound signal in the time domain as the feature of said sound signal.

6. The sound classification system according to claim 1, wherein said feature extractor calculates a zero-crossing rate of said sound signal in the time domain as the feature of said sound signal.

7. The sound classification system according to claim 1, wherein said classification result recorded by said classification recorder includes sound type, time of reception of said sound signal, waveform of said sound signal, an image captured during generation of said sound signal, and a duration of said sound signal.

8. The sound classification system according to claim 1, wherein said second database timely restores the backup copy of data back to said first database after a change in the data stored in said first database.

9. The sound classification system according to claim 1, wherein said feature database is capable of outputting the features of the sample sounds to said classifier.

10. The sound classification system according to claim 1, wherein said add/correct command processor can display an add/correct sound type operation interface to receive a command to correct/add a sound type, said add/correct sound type operation interface including a selection area to enable user selection of a sound type to be corrected or added, a browsing area to correspondingly display related classification result of the selected sound type, a playback button to control the playback of the selected sound type, an add type button to receive a command to add a sound type, and a correct type button to receive a command to correct a sound type.

11. The sound classification system according to claim 10, wherein said selection area includes a record window and a scroll-and-select key, said record window being capable of displaying a plurality of entries of sound classification results for selection by the user so as to correct the type of a sound or to add a new type for the sound, said record window also displaying an icon representing the type of the selected sound, said scroll-and-select key being capable of controlling said record window to display the classification result of the sound of the type that is to be corrected or added.

12. The sound classification system according to claim 10, wherein said browsing area includes a sound waveform window, a sound spectrum window, and a sound image window such that when the user selects a sound classification result in the record window, all the windows in said browsing area will correspondingly display related data of the selected entry of sound classification result, in which the sound waveform window will display a waveform of the sound, the sound spectrum window will display a spectrum of the sound, and the sound image window will display an image captured by said image capturing device when the sound occurred.

13. The sound classification system according to claim 11, wherein said add/correct command processor is capable of displaying an add sound type operation interface upon receipt of a command to add a sound type, said add sound type operation interface including a type name input window and an add type prompt window, said type name input window including a type name input field, an add type confirm key, and an add type cancel key, said type name input field being capable of receiving the name of a sound type to be added, said add/correct command processor displaying important messages via said add type prompt window, said add/correct command processor inspecting whether the name of the sound type entered into said type name input field already exists and, in the affirmative, displaying that the name of the sound type already exists via said add type prompt window, said add type confirm key being capable of receiving a command to confirm the command to add a sound type, said add type cancel button being capable of canceling the command to add a sound type.

14. The sound classification system according to claim 11, wherein said add/correct command processor is capable of displaying a correct sound type operation interface upon receipt of a command to correct a sound type, said correct sound type operation interface including an existing sound type window and a correct type prompt window, said existing sound type window including an existing sound type display area, a correct type confirm key, and a correct type cancel key, said existing sound type display area being capable of displaying all the existing sound types which are available for selection by the user so as to replace the sound type of the selected sound classification result in the selection area of said add/correct sound type operation interface, said add/correct command processor displaying important messages via said correct type prompt window, said correct type confirm key being capable of receiving a command to confirm a command to correct the sound type, said correct type cancel button being capable of receiving a command to cancel the command to correct the sound type.

15. The sound classification system according to claim 1, wherein said type adding/correcting device updates the corresponding statistical values of the features in said first database after the backup copy of the data in said first database has been stored into said second database.

16. The sound classification system according to claim 1, wherein said type adding/correcting device instructs said classifier to retrieve the features of all the sample sounds stored in said feature database after updating of the statistical values in said first database, and to re-determine classification of the features of the sample sounds according to the statistical values of the features of the sound types in said first database.

17. The sound classification system according to claim 1, wherein said precision calculator sends the feature of the sound to said feature database for storage and retains the updated statistical values in said first database when said ratio is higher than a threshold value, and otherwise, instructs said second database to restore the backup copy into said first database.

18. The sound classification system according to claim 1, wherein said precision calculator can further display said ratio of accurate classification of the features of the sample sounds in said feature database by said classifier once said ratio is determined.

19. A computer implemented method for correcting a sound type, said method being adapted for use in a sound classification system, said sound classification system including a first database for storing the statistical values of the features of a plurality of sounds, a classifier, a second database, a feature database for storing features of a plurality of sample sounds that have been accurately classified, an add/correct command processor, a type adding/correcting device, and a precision calculator, said method comprising:

instructing the add/correct command processor to receive a command to correct a sound type;

storing the statistical values of the features of the sound types in the first database into the second database to make a backup copy of data in the first database;

instructing the type adding/correcting device to add the feature of a sound requiring type correction to a type in the first database which was selected by the user, and to re-calculate the statistical values of the features of the sounds of the selected type in the first database;

instructing the classifier to retrieve the features of all the sample sounds in the feature database and to re-determine the classifications of the features of the sample sounds according to the statistical values of the features of each of the sound types in the first database, and instructing the precision calculator to calculate a ratio of accurate classification of the features of the sample sounds by the classifier; and instructing the type adding/correcting device to store the feature of the sound of the type to be corrected in the feature database if the ratio of accurate classification of the features of the sample sounds by the classifier is greater than a threshold value, and otherwise, instructing the second database to store the backup copy of data back into the first database.

20. The method for correcting a sound type according to claim 19, wherein the statistical values of each sound type include a mean and a variance of all the features of sound signals in the respective type.

21. A computer implemented method for adding a sound type, said method being adapted for use in a sound classification system, the sound classification system including a first database for storing the statistical values of the features of a plurality of sounds, a classifier, a second database, a feature database for storing features of a plurality of sample sounds that have been accurately classified, an add/correct command processor, a type adding/correcting device, and a precision calculator, said method comprising:

instructing the add/correct command processor to receive a command to add a sound type;

storing the statistical values of the features of the sound types in the first database into the second database to make a backup copy of data in the first database;

instructing the type adding/correcting device to add the feature of a sound requiring addition of a sound type to the first database, and to re-calculate the statistical values of the feature of the added sound type;

instructing the classifier to retrieve the features of all the sample sounds in the feature database, and to re-determine the classifications of the features of the sample sounds according to the statistical values of the features of each of the sound types in the first database, and instructing the precision calculator to calculate a ratio of accurate classification of the features of the sample sounds by the classifier; and instructing the type adding/correcting device to store the feature of the sound of the added type in the feature database if the ratio of accurate classification of the features of the sample sounds by the classifier is greater than a threshold value, and otherwise, instructing the second database to store the backup copy of data back into the first database.

22. The method for adding a sound type according to claim 21, wherein the statistical values of each sound type include a mean and a variance of all the features of sound signals in the respective type.

* * * * *

UNITED STATES PATENT AND TRADEMARK OFFICE
CERTIFICATE OF CORRECTION

| | | |
|---|---|---|
| PATENT NO. | : 8,037,006 B2 | Page 1 of 1 |
| APPLICATION NO. | : 11/994037 | |
| DATED | : October 11, 2011 | |
| INVENTOR(S) | : C. Yen et al. | |

It is certified that error appears in the above-identified patent and that said Letters Patent is hereby corrected as shown below:

On Cover Page 2 (56) References Cited, Other Publications, (Column 1, line 3) of the printed patent, "Recogntion" should be --Recognition--.

Signed and Sealed this
Third Day of April, 2012

David J. Kappos
*Director of the United States Patent and Trademark Office*